Oct. 27, 1970   N. A. NELSON   3,536,344
SUBSEA VALVE AND VALVE OPERATOR ASSEMBLY
Original Filed Jan. 15, 1968   6 Sheets-Sheet 1

FIG. 1.

INVENTOR:
NORMAN A. NELSON
BY *James D. Jackson*
ATTORNEY

FIG. 4.

INVENTOR:
NORMAN A. NELSON
ATTORNEY

Oct. 27, 1970  N. A. NELSON  3,536,344
SUBSEA VALVE AND VALVE OPERATOR ASSEMBLY
Original Filed Jan. 15, 1968  6 Sheets-Sheet 6

FIG.10

INVENTOR:
NORMAN A. NELSON
BY *James Jackson*
ATTORNEY

United States Patent Office 3,536,344
Patented Oct. 27, 1970

3,536,344
SUBSEA VALVE AND VALVE OPERATOR
ASSEMBLY
Norman A. Nelson, Houston, Tex., assignor to ACF Industries, Incorporated, New York, N.Y., a corporation of New Jersey
Original application Jan. 15, 1968, Ser. No. 697,706, now Patent No. 3,466,001, dated Sept. 9, 1969. Divided and this application May 13, 1969, Ser. No. 824,202
Int. Cl. F16l 37/18
U.S. Cl. 285—315      3 Claims

ABSTRACT OF THE DISCLOSURE

The invention relates to mechanical devices such as submergible valve and valve operator assemblies in which the valve and operator are maintained in sealed assembly by a plurality of segment clamps. A protective shroud which encloses the valve operator is movable relative to the operator to cause actuation of the segment clamps between their locked and unlocked positions, thereby effecting quick releasing of the connection between the valve and valve operator through simple movement of the shroud relative to the valve operator.

BACKGROUND OF THE INVENTION

This is a division of application Ser. No. 697,706, filed Jan. 15, 1968, now Pat. No. 3,466,001.

This application relates generally to valves which are controlled by power operators and more particularly to valves and valve operators which are adapted for quick and simple assembly and disassembly to facilitate ease of installation and repair. Although the invention is not limited to use under submerged conditions, it is primarily designed for ease of replacement and repair under adverse conditions frequently encountered when valves and valve operator assemblies are adapted for submerged service. For purposes of simplicity, however, discussion regarding the invention will be particularly related to the valve and valve operator assembly of this invention with relation to the submerged application thereof.

The petroleum industry in its search for reservoirs of petroleum products such as crude oil and natural gas has discovered vast reserves of oil and gas which are located beneath the surface of the ocean in various parts of the world. Technology advances related to the drilling and completion of wells in the ocean floor have been impeded greatly by the hostile environment in which the drilling and well completion operators are conducted. Where the water covering the ocean floor is relatively shallow, the tendency is to position the wellhead above the surface of the ocean if possible so that the wellhead equipment is accessible for installation and service. For example, a number of adjacent wells may be completed by positioning the wellhead assemblies on a platform above the surface of the ocean and extending the well conduits to the subsea wells. This is generally considered an acceptable practice since wellheads located above the sea surface are not necessarily required to have remotely controlled valve operator assemblies. Each of the valves of above surface wellhead assemblies may have manual operator which may be controlled by personnel gaining access to the platform. It is obvious that repair operations can quite readily be performed on wellheads positioned above the surface of the sea.

Platform completions of wells are subject to some disadvantage however. The platforms are subject to damage or destruction by fire, storms or by collision with surface vessels. Frequently, however, the water where the well is located is of considerable depth and the wellhead assembly must be placed on the ocean floor. The valves of a wellhead assembly adapted for ocean floor completion therefore must be especially adapted for undersea service and must be provided with remotely controllable power operators to allow control functions to be directed from a distant control station. Although ocean floor completions of wells are deemed mandatory at times, such completions are generally considered undesirable because of the hazards of the environment in which the wellhead assembly is located. Submerged wellhead assemblies are extremely difficult to service because of the hostile environment in which a diver must work while servicing the same. Frequently the depth of the ocean in which the valve is located is too deep for a diver to work and it then becomes necessary to provide remotely controlled equipment for repair of the wellheads or it is necessary to raise the wellhead to the surface of the ocean for repair. Either of these methods of repair is considered excessively expensive.

SUMMARY OF THE INVENTION

The invention is designed to promote effective and inexpensive ocean floor completion of wells and to facilitate simple and easy repair of the valve and operator assembly on wells which may be accomplished readily by a diver in relatively shallow water or may be accomplished by means of remotely controlled equipment in the event that the water is too deep for a diver to work. To accomplish this the invention has as its prmary object the provision of a novel valve and valve operator assembly which may be readily separated by simple mechanical structure so that the operator may be raised to the surface of the ocean floor for repair.

Another object of the invention involves the provision of a novel valve and valve operator assembly which is adapted for protection of the internal parts thereof from contamination by seawater or other corrosive fluids.

It is a further object of my invention to provide a novel valve and valve operator assembly which includes means for properly aligning the valve and valve operator during assembly so that connection of the same may be readily accomplished through the use of remotely controlled connection equipment.

Among the objects of my invention is contemplated the provision of a novel valve and valve operator assembly which, when the operator is disassembled from the valve, will cause all of the movable internal parts of the valve to be extracted so that the same can be carried to the surface of the ocean for replacement or repair.

It is an even further object of my invention to provide a novel valve and valve operator assembly which incorporates means for controlling the interchange of fluid between chambers within the operator structure so that a balanced condition is maintained with reference to the fluid in which the valve is submerged at all times.

Another object of my invention involves the incorporation within a novel valve and valve operator assembly of means for remote indication of the position of the valve and valve operator during or subsequent to operation thereof.

The novel features of the present invention are set forth with particularity in the appended claims. The present invention both as to its organization and manner of operation together with other and further objects and advantages thereof may best be understood by way of illustration and example of certain embodiments when taken in conjunction with the accompanying drawings in which:

Figure 1:
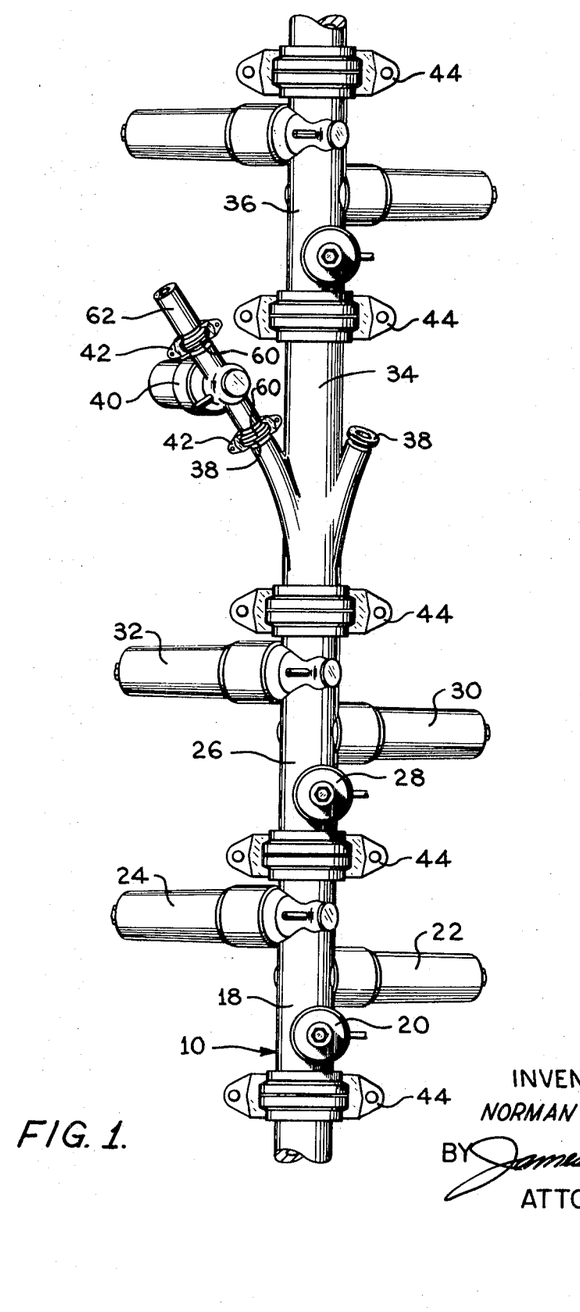
FIG. 1 is a perspective view of a portion of a dual completion wellhead provided with valve and valve operator assemblies which are constructed in accordance with this invention.

Referring now to the drawings for a more detailed description of the invention, in FIG. 1 there is shown a wellhead valve assembly 10 for a dual completion wellhead having three flow passages 12, 14 and 16 (FIG. 2) extending to two producing zones beneath the surface of the earth. One of the flow passages serves as a fluid return line to allow the circulation of fluid, oil tools and other devices when the same are forced into and out of the well by fluid pressure. The valve assembly 10 includes a conduit for each of the strings of tubing, each conduit being controlled by a series of valves. For example, a bottom master section 18 of the valve assembly includes master valves 20, 22 and 24 for controlling the flow of fluid through the individual strings of tubing. The valve assembly also includes a top master section 26 which includes three top master valves 28, 30 and 32 which also control the flow of fluid through the flow passages 12, 14 and 16. Ordinarily the bottom master valves 20, 22 and 24 remain in an open condition and are closed only in event of emergency. The valve assembly is provided with a wing valve section 34 and a swab valve section 36, each which includes one valve for each of the three flow passages. The wing valve section is provided with integral flanges 38 to which is connected a valve and valve operator assembly 40 by means of clamps 42. The wing valve section includes three valves and operator assemblies although, for purposes of simplicity and to eliminate confusion, only one of the wing valve and operator assemblies is shown. The various sections of the valve assembly may be connected by means of flanges, such as that shown at 44, although other means of connecting the valve sections is contemplated within the spirit and scope of the instant invention.

Figure 2:
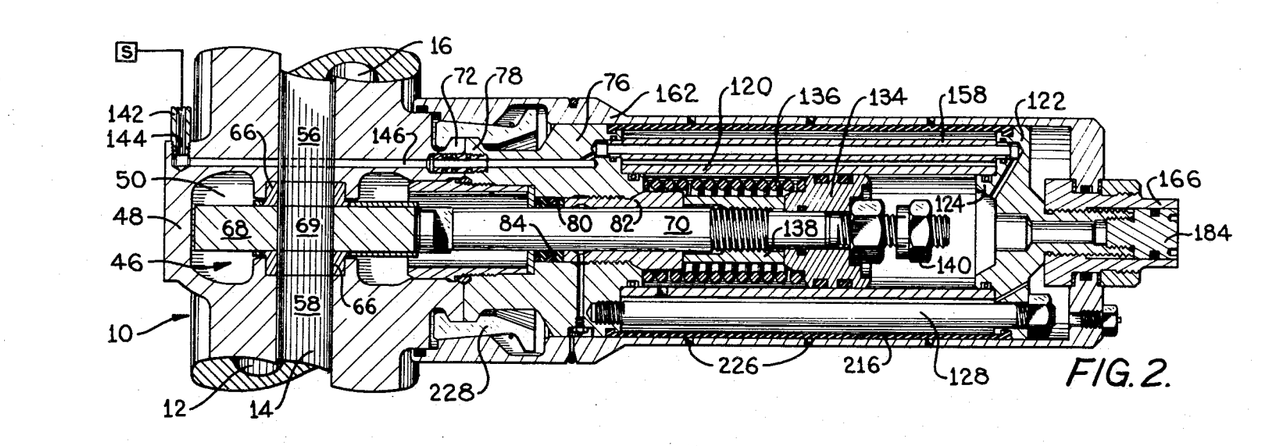
FIG. 2 is a fragmentary sectional view of the wellhead assembly of FIG. 1 showing one of the valves and valve operator assemblies in detail with the latching mechanism thereof disposed in the locked position.

For a more detailed description of the invention, reference may be had to FIG. 2 which illustrates one valve 46 of one of the wellhead valve assemblies or sections and its associated valve operator in detail. The valve 46 is provided with a valve body 48 being formed integrally with the respective master or swab section of the valve assembly and which defines an internal valve chamber 50. The valve body 48 is provided with flow passages 56 and 58 which are disposed in fluid communication with the valve chamber 50 and which are also disposed in communication with and form a part of the flow passage 14. Alternatively, the valve body 48 may be provided with a conduit structure defining annular flanges such as that illustrated at 60 in FIG. 3 for connection of the valve to a wing connection 38 of the wellhead valve assembly 10 and for connection of the valve to flow line structure 62 by the means of conventional clamp structures 42. It is considered obvious that the wing valve structure may be provided with other conventional types of connection structures without departing from the spirit and scope of this invention. The valve 46 is provided with at least one and preferably a pair of seat assemblies 66 which are disposed within recesses formed about the flow passages 56 and 58. The seat assemblies 66 are disposed for sealing engagement with a valve member 68 which is disposed for movement within the valve body. The valve member or gate member 68 is provided with an aperture 69 which is aligned with the flow passages 56 and 58 in the open position of the valve to allow the flow of fluid through the valve. A valve stem 70 is connected with the gate member 68 and serves to move the gate member between its open and closed positions as desired.

Figure 4:
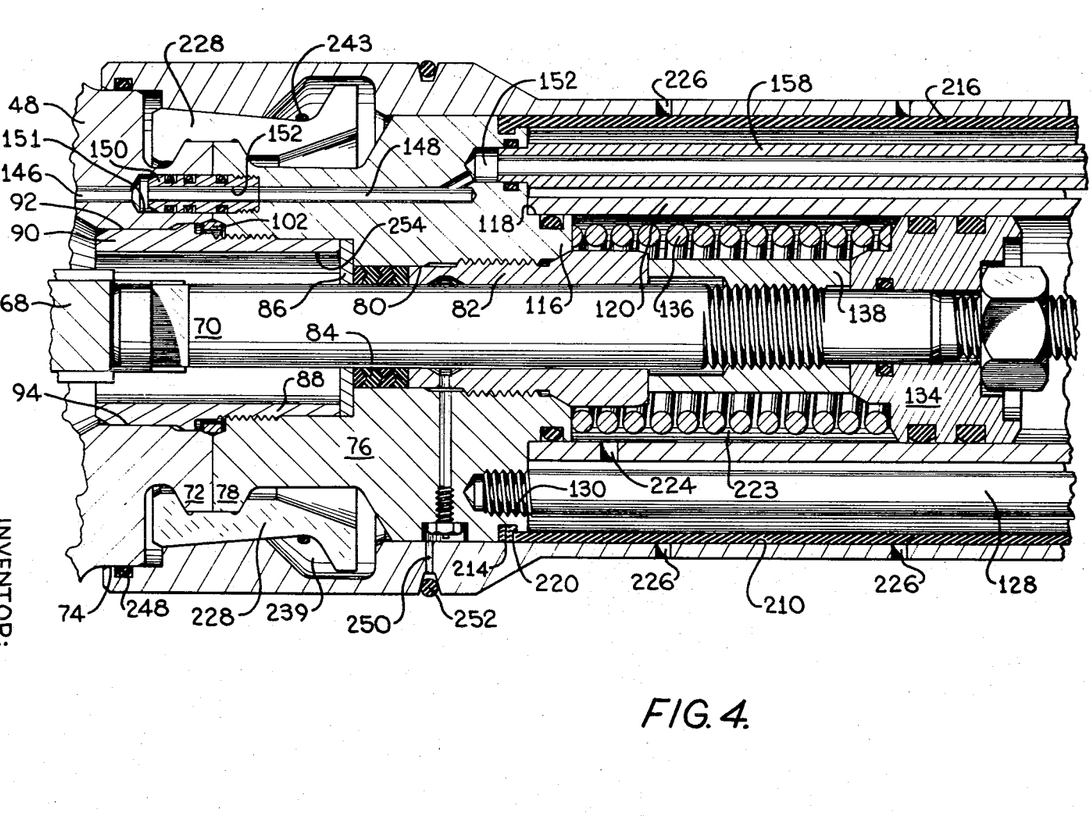
FIG. 4 is a fragmentary sectional view of the valve and valve operator structure of FIG. 2 illustrating the latching mechanism in detail.

With reference to FIGS. 2 and 4, the valve body 48 terminates in an annular body flange 72 which is smaller in diameter than a cylindrical surface 74 defined at the outer extremity of the valve body. For purpose of explanation, the terms "outer" and "outward" refer to the direction away from the flow passage of the valve while terms such as "inner" and "inward" refer to direction toward the flow passages of the valve.

The valve operator portion of the assembly includes a valve operator base 76 defining an annular bonnet flange 78 which, when in assembly with the valve body 48, is disposed in abutment with the body flange 72. The operator base is provided with aperture 80 through which the valve stem 70 extends. The aperture 80 receives a stem guide bushing 82 in threaded engagement therein which serves to maintain precise alignment of the valve stem 70 relative to the operator base 76. The inner extremity of the guide bushing 82 cooperates with the aperture 80 and with the valve stem 70 to define an annular packing chamber in which is disposed a packing assembly 84 maintaining a fluid-tight seal between the valve stem 70 and the walls defining the aperture 80. A packing retainer 86 surrounds the valve stem 70 and is disposed in engagement with the packing assembly 84 to retain the same in its proper position. An annular guide sleeve member 88 is threadedly retained within the operator base 76 and is disposed with the outer extremity thereof in engagement with the packing retainer 86 to maintain the same in position. The guide sleeve 88 is provided with a nose portion or inner extremity portion 90 defining an outer cylindrical surface 92. A cylindrical surface 94 which is formed on the valve body 48 receives the cylindrical surface 92 of the guide sleeve 88 in relatively close fitting relation in order to maintain precise alignment between the valve operator base 76 and the valve body 48.

Figure 7:
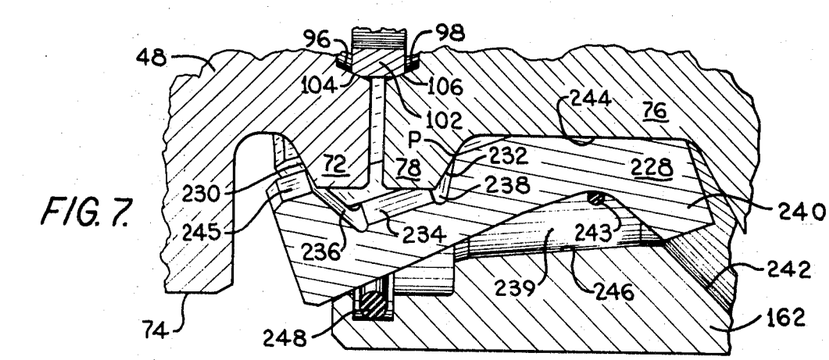
FIGS. 7, 8 and 9 are partial sectional views of the latching mechanism of FIG. 2 which illustrate the clamping mechanism in various positions thereof between the locked and unlocked positions.
Figure 10:
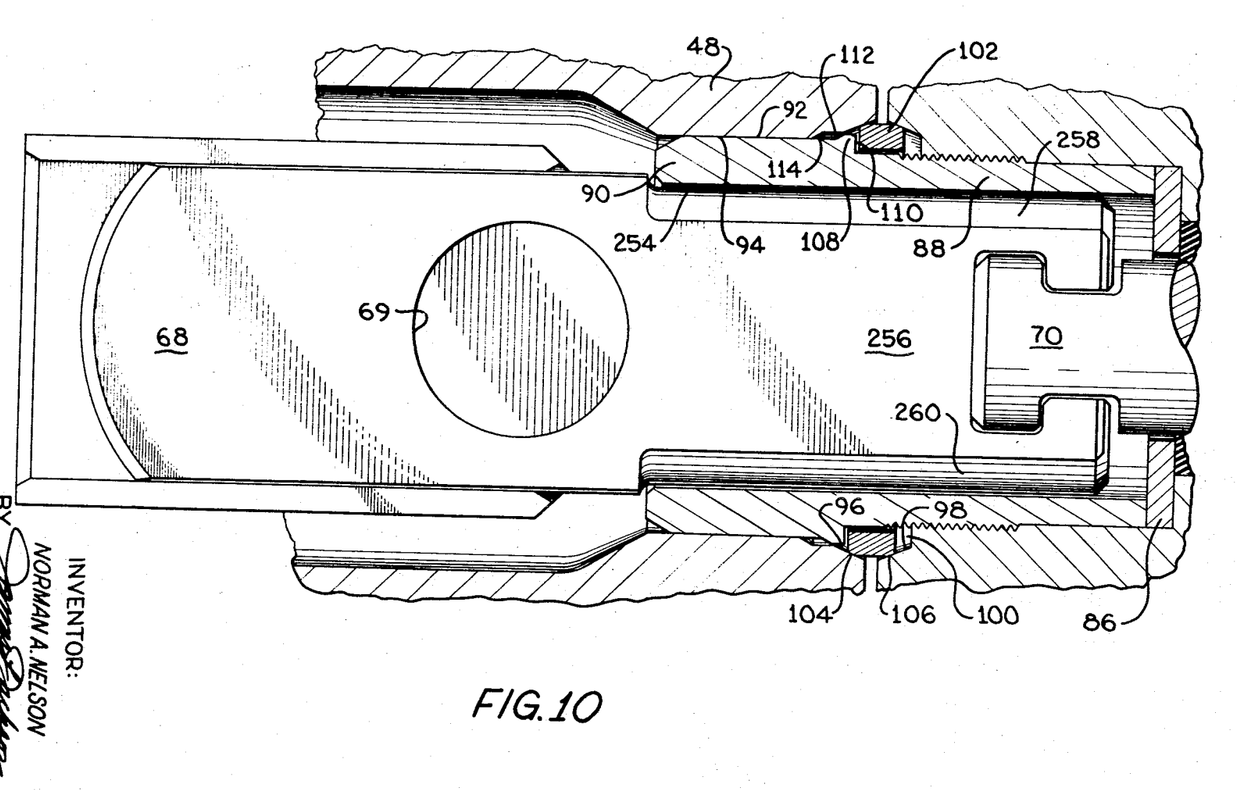
FIG. 10 is a fragmentary sectional view of the operator of FIGS. 2 and 3 illustrating the guide sleeve and joint seal structure thereof in detail.

The valve body 48 and the operator base 76 are provided with oppositely tapered frusto-conical surfaces 96 and 98 respectively shown in detail in FIG. 7 and which include a portion thereof spaced from the outer periphery of the guide sleeve 88 which cooperates with the guide sleeve to define an annular seal chamber 100 as best shown in FIG. 10. An annular sealing member 102 within the chamber 100 is disposed about the guide sleeve 88 and is provided with frusto-conical surfaces 104 and 106 which establish sealing relation with the surfaces 96 and 98 respectively. The geometry of the seal ring 102 is so related to the geometry of the annular chamber 100 that initial contact between the surfaces 104 and 106 and the surfaces 98 and 96 is made before the abutting surfaces of the bonnet flange 78 and the body flange 72 are drawn into intimate abutment. As the body flange and bonnet flange are drawn into abutment, the annular sealing member 102 will be deformed in its areas of contact with the frusto-conical surfaces 96 and 98, thereby developing a fluid-tight seal. The outer peripheral surface of the guide sleeve 88 is disposed in close proximity to the inner peripheral surface of the seal member 102 and effectively maintains proper alignment of the seal member relative to the frusto-conical surfaces 96 and 98. The annular seal member 102 may be composed of relatively soft metal or it may be composed of other suitable materials without departing from the spirit or scope of this invention.

Intermediate the extremities of the guide sleeve 88, there is provided a peripheral enlargement 108 as shown in detail in FIG. 10 which defines an annular abutment 110. The annular abutment 110 is larger in diameter than the inner periphery of the annular seal member 102, thereby engaging the seal member and retaining it in assembly with the guide sleeve when the guide sleeve is retracted from its engaged position with the valve body. This feature assures that the annular seal member 102 is retained along with the valve operator assembly so that it will be raised to the surface of the ocean with the valve operator assembly for repair or replacement. The peripheral enlargement 108 also defines a tapered surface 112 which is adapted to engage a tapered surface 114 formed on the valve body to prevent the guide sleeve 88 to become disassembled from the operator base 76. In the event the threaded engagement between the guide sleeve 88 and the operator base 76 should become loosened by vibration or the like, the guide sleeve 88 will be allowed to back off only sufficiently to cause engagement between the tapered surfaces 112 and 114, thereby maintaining ample threaded engagement to prevent separation. It will be impossible therefore for the guide sleeve 88 to become completely disassembled from the operator base and remain with the valve body upon disassembly of the operator from the valve body.

The operator base 76 is provided with an axially extending portion 116 as shown in FIG. 4 defining a cylindrical surface 118. A valve operator cylinder 120 surrounds the axially extending portion 116 and is disposed in sealed relation with the cylindrical surface 118. A cylinder cap 122 shown in FIG. 5 forms a closure for one extremity of the cylinder and includes an axially extending portion 124 which is received in sealed relation within the cylinder 120. The cylinder cap 122 extends radially beyond the outer periphery of the cylinder 120 defining a flange 123 which is provided with a series of bolt openings 126. A series of bolts 128 are received within threaded apertures 130 formed in the operator base 76 and extend through the bolt openings 126. A series of nuts 129 are received on the bolts 128 and serve to maintain the cylinder cap in engagement with the cylinder 120 in addition to maintaining the cylinder in engagement with the operator base 76.

A piston 134 is movably disposed within the cylinder 120 and is connected to the valve stem 70 which extends through the operator base 76 into the cylinder 120. A compression spring member 136 is interposed between the piston 134 and the operator base 76 and serves to bias the piston in an outwardly direction away from the valve body 48. A piston stop member 138 is connected to the valve stem 70 by threads or the like and is adapted to engage the operator base 76 to limit movement of the piston in a direction toward the valve body. The piston stop 138 is preferably adjustable relative to the valve stem to position the port 69 in registry with the flow passages 56 and 58 in the open position of the valve. Movement of the piston member 134 in a direction away from the valve body is limited by means of a stop nut 140 which is threadedly received on the valve stem 70 and which engages the cylinder cap 122 to limit piston travel. The stop nut 140 is adjustable relative to the valve stem to provide for optimum positioning of the valve member 68 in the closed position of the valve.

For energization of the hydraulic motor for actuation of the gate member, hydraulic fluid is supplied from a controllable source S to the valve and valve operator assembly by means of a supply conduit 142 which is threadedly received within a threaded aperture 144 formed in the valve body. The threaded aperture 144 is in fluid communication with a hydraulic fluid passage 146 formed in the valve body 46 which, when the valve and operator are assembled, is disposed in registry with a hydraulic fluid passage 148 formed in the operator base 176. A connector pin 150 is threadedly received within a threaded portion of the fluid passage 148 and is provided with a cylindrical portion which is disposed in sealed relation with an enlarged portion of the fluid passage 146 when the valve body and operator are in assembly. The connector pin 150 is provided with a fluid passage 152 which maintains communication between the fluid passage 146 and 148. To conduct hydraulic fluid from the operator base to the remote extremity of the hydraulic cylinder, the operator base 76 and the cylinder cap 122 are provided with cylindrical bores 152 and 154 which receive the extremities of a tubular conduit member 158 in sealed relation therein. The fluid passage 148 in the operator base is disposed in fluid communication with the cylindrical bore 154 while fluid communication between the hydraulic cylinder and the cylindrical bore 156 is maintained by a fluid passage 160 formed in the cylinder cap 122. To actuate the valve member 68 inwardly toward the valve body thereby moving the valve to its open position, hydraulic fluid under pressure is conducted through the supply conduit 142 to the internal valve and valve operator assembly passage defined by the fluid passages 146, 152, 148, 158 and 160. Hydraulic fluid introduced into the hydraulic cylinder outwardly of the piston member 134 causes the piston member to be moved inwardly toward the valve body causing compression of the spring 136 and causing movement of the valve stem 70 and valve member 68 to a position registering the port 69 of the valve member with the flow passages 56 and 58 of the valve. In the event it is desired to move the valve member 68 to its closed position, the source S of pressurized hydraulic fluid is controlled to allow the compression spring member 136 and the fluid pressure acting through the exposed surface area of the valve stem to force the piston 134 outwardly away from the valve body causing the hydraulic fluid to flow out of the cylinder and allowing the valve stem 70 and the valve member 68 to move to the closed or FIG. 3 position.

In the event double hydraulic actuation is desirable for actuation of the piston both inwardly and outwardly, it is deemed obvious that the valve body and operator base may be provided with fluid passage means similar to that described above to communicate the inner portion of the hydraulic cylinder to a controllable pressurized source of hydraulic fluid.

Figure 5:
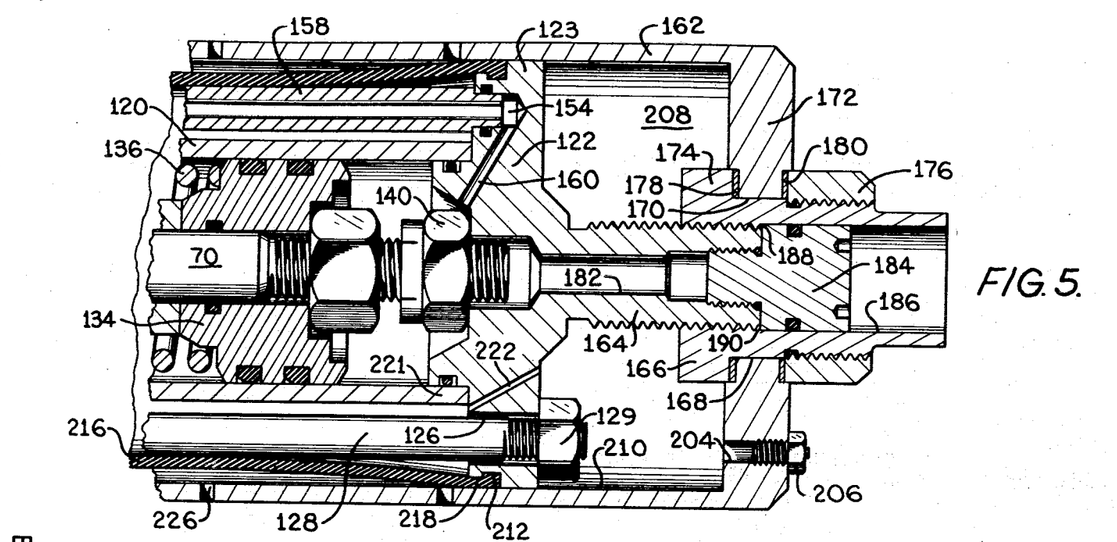
FIG. 5 is a fragmentary sectional view of the valve operator of FIG. 2 illustrating the shroud drive assembly of the operator in detail.

The valve operator is provided with a shroud 162 which is disposed about the parts of the operator mechanism and which provides a protective cover for the same. To connect the shroud 162 to the operator structure, the cylinder cap 122 of the hydraulic motor as shown in FIG. 5 is provided with an integral connecting stem 164 having a threaded peripheral surface. A drive nut 166 is provided with internal threads and is threadedly received on the connecting stem 164. The drive nut 166 is provided with a cylindrical portion 168 which is disposed in rotatable sealed relation with a cylindrical aperture 170 formed in the end wall 172 of the shroud 162. To maintain the drive nut 166 against axial movement relative to the end wall 172, the drive nut is provided with an annular flange 174 which prevents axial movement of the drive nut in the outward direction relative to the end wall 172. To prevent axial movement of the drive nut relative to the end wall in the inward opposite direction, a drive nut retainer 176 is threadedly received on an externally threaded portion of the drive nut. The end wall 172 is recessed at its upper and lower surfaces which cooperate with the annular flange 174 and the drive nut retainer 176 to define annular bearing chambers. A pair of circular bearing members 178 and 180 are maintained within the bearing chambers and serve to prevent the development of excessive friction between the end wall 172 of the shroud and the drive nut and drive nut retainer structure. The drive nut retainer 176 threadedly engages the drive nut by means of left-hand threads which prevent the drive nut retainer from backing off and becoming disengaged from the drive nut.

The connecting stem 164 of the cylinder cap 122 is provided with an axial bore 182 which is provided with left-hand threads at the outermost portion thereof for receiving the left-hand threaded portion of a closure plug 184. The drive nut 166 is provided with an axial bore 186 which cooperates with the internally threaded portion of the drive nut to define an annular shoulder 188, which provides a stop to limit outward movement of the shroud member 162 relative to the end cap and hydraulic actuator portion of the operator. The closure plug 184 has a relatively close fitting sealed relation with the axial bore 186 of the drive nut and defines an annular stop surface 190 which is disposed for contact with the annular stop shoulder 188 of the drive nut 166 at the outermost position of the shroud member 162. The left-hand threads connecting the closure plug 184 to the connecting stem 164 effectively prevent the closure plug 184 from backing out and becoming disengaged from the connecting stem upon rotation of the drive nut 166.

Figure 6:
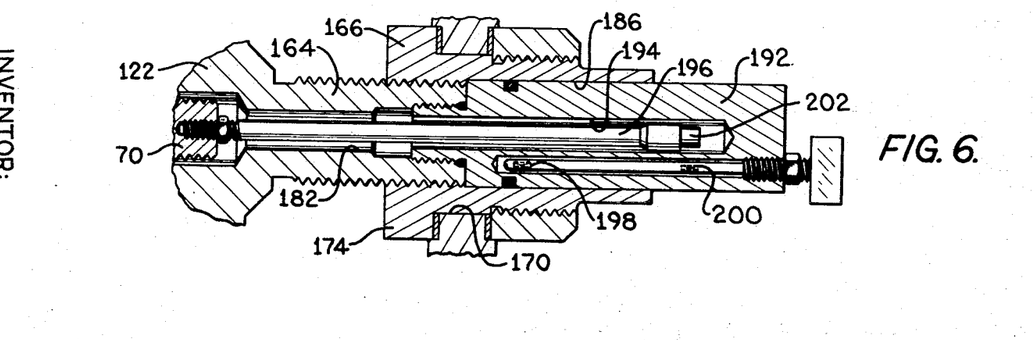
FIG. 6 is a partial sectional view of the operator structure of FIG. 4 illustrating a position indicator mechanism which may be fitted to the operator if desired.

With reference now to FIGS. 5 and 6, the cylinder cap and drive nut construction is such that the closure plug 184 may be removed and replaced with a position indicator mechanism 192 which is provided with a lower configuration substantially identical to the configuration of the closure plug 184 and which is received in the same manner as the plug 184 by the left-hand threads in the axial bore 182 of the cylinder cap. The position indicator mechanism 192 is provided with an internal axial bore 194 which is adapted to receive a position indicator stem 196 carried by the outer extremity of the valve stem 70. The position indicator mechanism 192 is provided with inner and outer reed switches 198 and 200 respectively or with any other suitable circuitry control devices which are connected to suitable electrical circuitry not shown for transmission of an electrical signal to a remotely located control facility. The reed switches 198 and 200 are closed to energize the signal circuitry thereof by the proximity of a permanent magnet member 202 which is fixed to the free extremity of the position indicator stem 196. It is apparent therefore that upon reciprocal movement of the valve member 68 and the valve stem 70 by the hydraulic actuator, the position indicator stem 196 will be moved reciprocally by the same amount. The reed switches 198 and 200 are positioned so that they are closed to energize the signal circuitry at the maximum inward and maximum outward positions of the valve stem.

The shroud member 162 is provided with an opening 204 in the end wall 172 thereof as shown in FIG. 5 through which a protective fluid such as hydraulic fluid is introduced into the space defined between the hydraulic actuator and the shroud member. A closure and check valve member 206 is threadedly received within the opening 204 defining a closure therefor. In the event fluid pressure within the protective fluid chamber 208 increases to a dangerous level, this pressure will be relieved through the check valve structure 206.

With reference particularly to FIGS. 4 and 5, the outer periphery of the cylinder cap 122 and the outer periphery of the operator base 76 have a relatively close fit with the interior surface 210 of the shroud member 162. A pair of annular recesses 212 and 214 are formed respectively in the cylinder cap 122 and operator base 76 and receive the internally beaded extremities of a flexible diaphragm member 216 which is generally in the form of a cylindrical sleeve. The inner periphery 210 of the shroud 162 cooperates with the annular recesses 212 and 214 and with annular shoulders 218 and 220 to lock the beaded extremities of the diaphragm 216 within the recesses 212 and 214. The locked beaded peripheries of the flexible diaphragm develop a fluid-tight seal between the shroud and operator base and the end cap to prevent seawater or other external fluid medium from entering. The space between the inner periphery of the flexible diaphragm 216 and the outer periphery of the cylinder 120 defines an inner portion 221 of the protective fluid chamber 208 which is in fluid communication with the outer portion of the protective fluid chamber by means of one or more fluid passages 222 formed in the cylinder cap 122. An inner cylinder portion 223 of the protective fluid chamber 208 is defined by the space within the cylinder 120 between the piston 134 and the operator base 76 and is in communication with the other portions of the protective fluid chamber by means of a port 224 formed in the cylinder 120. It is obvious however that the port 224 would be eliminated if the hydraulic operator were adapted for double actuation as discussed above. The outer periphery of the flexible diaphragm 216 is in communication with the medium surrounding the valve and operator by means of a series of ports 226 which are formed in the shroud 162. The flexible diaphragm therefore serves to transmit the hydrostatic pressure from the medium surrounding the valve to the fluid located within the protective fluid chamber 208 so that a balanced pressure may be maintained between the protective fluid and the hydrostatic head. This feature allows the shroud and other protective structures of the operator mechanism to be constructed of relatively light material since they will not be subjected to the effects of severe hydrostatic pressures. The flexible diaphragm 216 also allows the hydraulic actuator to be energized to move the piston therein and causing displacement of the protective fluid located inwardly of the piston without causing a change in the pressure of the protective fluid within the chamber 208. For example, assuming that the piston 134 is moved inwardly toward the valve body 48, fluid within the inner portion of the protective fluid chamber within the cylinder 120 will be forced by the piston outwardly through the port 224 into the outer portions of the fluid chamber 208 causing the flexible diaphragm 216 to expand. Seawater or any other fluid medium in which the valve and operator assembly is located will be forced by the flexible diaphragm outwardly through the ports 226, thereby preventing a rise in internal pressure within the protective fluid chamber. When the shroud member 162 is moved axially outward relative to the valve body, protective fluid will flow through the passages 222 into the outermost portion of the protective fluid chamber 208, thereby preventing the development of a vacuum or partial vacuum. At the same time the fluid displaced from the protective fluid chamber will cause the flexible diaphragm to be forced inwardly by the pressurized fluid medium surrounding the valve which flows through the port 226. It is apparent therefore that through the use of a flexible diaphragm 216 protective fluid may be transferred from one portion of the protective fluid chamber to another and the internal volume of the protective fluid chamber 208 may change without changing the fluid pressure therein.

With reference now to FIGS. 4, 7, 8 and 9, sealed connection between the valve body 48 and the operator base 76 is maintained by a plurality of segment clamps 228 which are positioned about the body flange 72 and the bonnet flange 78 to hold the flanges in abutting sealed assembly.

The annular flanges 72 and 78 are provided with frusto-conical surfaces 230 and 232 respectively which are oppositely disposed and when the valve body is in abutment with the operator base 78, the surfaces 230 and 232 are disposed in inwardly diverging relationship with respect to the longitudinal axis thereof. The segment members 228 are provided with a slot 234 which defines inwardly diverging surfaces 236 and 238 which are adapted for intimate engagement respectively with the frusto-conical surfaces 230 and 232 formed on the bonnet and body flanges. The surfaces 236 and 238 of the segment clamps 228 have camming engagement with the surfaces 230 and 232 of the annular flanges which cooperate to cause the abutting surfaces of the valve body and operator base to be drawn into intimate abutting engagement upon the application of peripheral force to the segment clamps.

Figure 8:
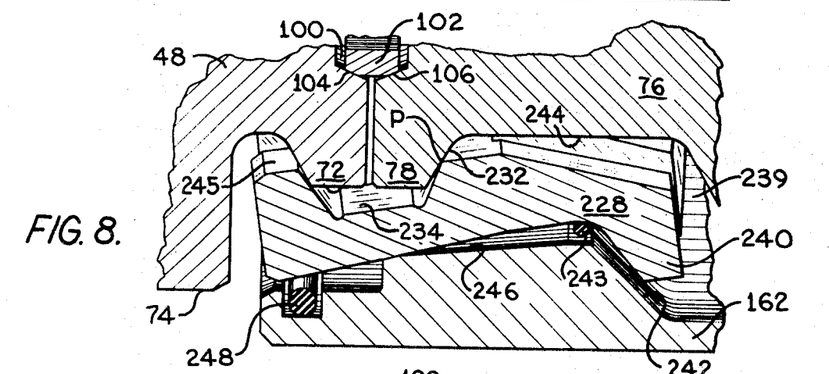
Figure 9:
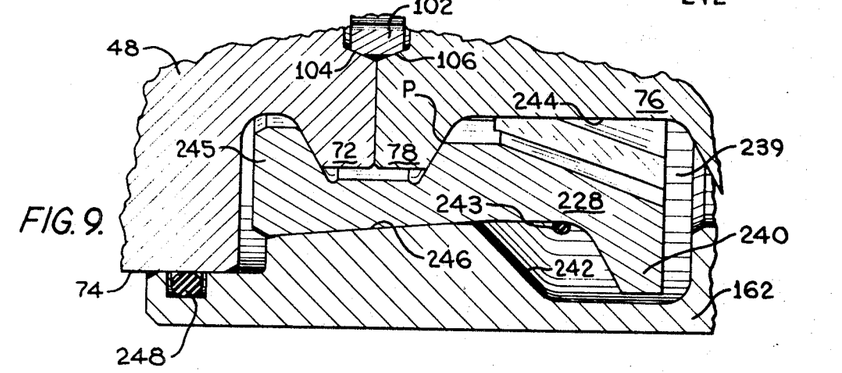

The segment clamps are loosely retained within an annular recess 239 defined between the shroud member and the operator base 76 as shown in FIGS. 7, 8 and 9. The geometry between the shroud member and the operator base structure prevents the segment clamps from becoming displaced from the annular recess as the shroud member is moved between its inward and outward positions. A pivot point P is established by engagement of the central portion of each segment clamp with the frusto-conical surface 232 of the operator base 76. The segment clamps are rotatable about the pivot point P between a locked position illustrated in FIGS. 2, 4 and 9 and an unlocked position illustrated in FIGS. 3 and 7. The segment clamps are provided with an outwardly extending portion 240 which is disposed in the locked position thereof for contact with an unlocking cam surface 242 defining an inner surface of the shroud 162. The cam surface 242 upon movement of the shroud member 162 in an outwardly direction away from the valve body 48, as described above, will engage the outwardly extending portion 240 of the segment clamps 238 causing the segment clamps to be pivoted about the point P toward the unlatched or FIG. 3 position thereof. At the same time the outwardly extending portion 240 of each of the segment clamps 228 is rotated downwardly into an annular recess defined by a reduced diameter portion 244 of the operator base. This causes the outwardly extending portion 240 of each of the segment clamps to clear the smallest internal diameter of the shroud member 162 and at the same time pivots the nose portion 245 clear of the annular flange 72 as illustrated in detail in FIG. 7. Upon reaching the unlatched or FIG. 7 position of the segment clamps 228, the valve body 48 and the operator base 76 may be separated. The segment clamps may be surrounded by a resilient member 243 to aid in moving the segment clamps to the unlatched or FIG. 7 position thereof and to assure against movement of the segment clamps by vibration or the like. The resilient band member however is not intended to assure positive unlocking of the clamp segments. As indicated above the unlocking cam surface 242 effectively assures positive movement of the clamping segments by virtue of engagement between the outwardly extending portion 240 of the clamps and the surface 242.

Assembly of the valve operator to the valve body is achieved by inserting the valve member 68 and the guide sleeve 88 into the valve body and bringing the body flange 72 and the bonnet flange 78 into juxtaposition. When this occurs, the annular sealing member 102 will engage the frusto-conical surfaces 96 and 98 as discussed above, thereby maintaining the body flange and the bonnet flange in slightly spaced relationship. The shroud member 162 is then moved inwardly toward the valve body by rotation of the drive nut 166 in the manner described above thereby causing a locking cam surface 246 to engage the outer surfaces of the segment clamps 228. As the shroud member 162 is moved to its maximum inward position, the locking cam surface 246 develops peripheral forces on the segment clamps 228 thereby causing the mating diverging surfaces of the segment clamps and body and bonnet flanges to urge the valve body and operator base into intimate abutting sealed engagement.

The shroud 162 is provided with an internal sealing member 248 which may be an O-ring member or the like retained within an annular groove which establishes sealing engagement with the cylindrical surface 74 of the valve body 48 providing an environmental seal which prevents contamination of the clamping segments and the flanges by seawater or the like and also prevents the formation of marine growth about the locking structure.

When the valve operator is installed on a valve or a subsea wellhead, it is generally contemplated that the annular recess 239 between the operator base and the shroud will be filled with a viscous protective substance such as grease for the purpose of excluding as much seawater as possible from the clamping structure. When the operator is assembled to the valve body, a portion of the viscous substance will be forced ahead of the clamping segments to exclude water from the flange area of the valve body. After sealing contact has been established between the annular sealing member 248 and the cylindrical sealing surface 74 of the valve body, it is obvious that if pressure relief means is not provided it could be possible for fluid pressure of the viscous substance within the sealed clamping area to increase substantially on further movement of the shroud member toward the valve body possibly creating a hydrostatic locking condition. To prevent hydrostatic locking and to prevent substantial increase in fluid pressure in the clamping area, a relief passage 250 shown in FIG. 4 communicates the annular recess 239 with the medium surrounding the valve and is controlled by a relief and check valve 252 which allows the flow of fluid outwardly of the annular recess, but prevents seawater from entering into the passage 250. If desired, the shroud member can be provided with purge fittings not shown which communicate with the annular recess 239 containing the segment clamps 228. Subsequent to assembly of the operator to the valve body therefore purging hoses may be connected to the purge connectors and a preservative fluid may be circulated through the annular recess thereby purging the recess of any trapped seawater.

Figure 3:
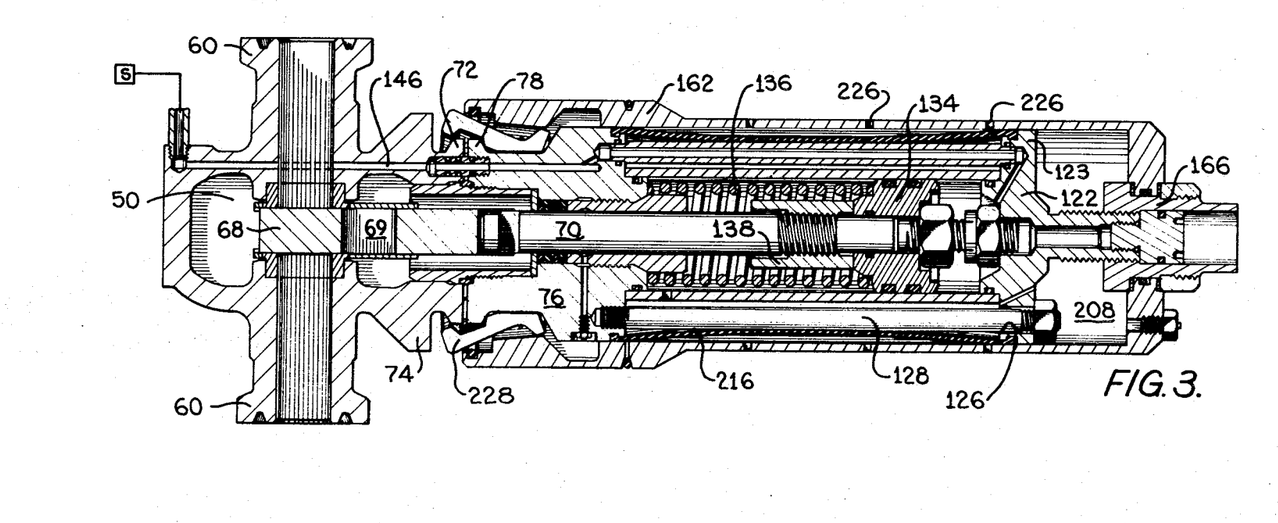
FIG. 3 is a sectional view of a wing valve and valve operator mechanism of FIG. 1 illustrating the latching mechanism of the operator in the unlocked position thereof.

For subsea installation of the valve operator to a subsea wellhead valve system having valve bodies such as that shown at 10, the operator with its shroud 162 in the retracted position thereof as shown in FIGS. 3 and 4 is lowered to the vicinity of the wellhead valve system. For the purpose of installation of the operator on the valve body, it is necessary that the valve member be accurately aligned with the operator base so that the mating parts of the valve body and valve will be properly positioned to accomplish precise alignment the guide sleeve is provided with a generally cylindrical internal guide surface 254 which is adapted to receive the shank 256 of the valve member in relatively close fitting relation therein. The shank 256 is provided with partially cylindrical surfaces 258 and 260 which are adapted for relatively close guiding relation with the cylindrical surface 254. The associated guiding surfaces of the guide sleeve and shank are of considerable length relative to the overall length of the valve member therby serving to maintain accurate angular alignment between the valve member and valve stem. When the valve member is moved to its closed position therefore the articulated connection between the valve member and the valve stem is substantially immobilized and the valve member will be allowed angular misalignment of only a few thousandths of an inch relative to the axis of the valve stem. It is important that the piston 134 of the hydraulic actuator be moved to its outermost position, thereby drawing the valve member stem connection structure and the valve shank 256 fully into the guide sleeve 88 as illustrated in FIG. 10 and accurately aligning the valve member with respect to the cylindrical surface 92 of the guide sleeve 88. The valve member and the nose portion 90 of the guide sleeve 88 are then inserted into the valve body causing proper positioning of the bonnet flange 78 with respect to the body flange 72 by virtue of the valve and gate guide sleeve. The valve operator base 76 will then be moved toward the valve body 48 sufficiently to bring the annular seal member 102 into contact with the frusto-conical surfaces 96 and 98 of the valve body and operator base respectively as described above. As the valve body and operator base are brought into juxtaposition, the connector pin 150 will be received in sealed relation within the cylindrical connector pin bore 151, therby serving to establish a sealed connection between the hydraulic passages 146 and 148 and also providing a means to resist torque when the drive nut 166 is rotated with respect to the connecting stem 164. Subsequent to movement of the body flange and bonnet flange into juxtaposition and establishing contact between the annular sealing member 102 and the frusto-conical sealing surfaces, the drive nut 166 is rotated with respect to the connecting stem 164 which, through the threaded connection between the drive nut and the connecting stem, causes linear movement of the shroud member 162 relative to the operator base 76. Friction between the drive nut 166 and the shroud member 162 will be maintained at a minimum because of the bearing members 178 and 180 which are interposed between the drive nut and the end wall of the shroud. Any friction imparted between the drive nut and the shroud however will be resisted by the connector pin 150, thereby preventing any rotation of the shroud member relative to the operator base 76. Due to the particular connection between the shroud and the drive nut as indicated above it is obvious that the shroud may rotate with the drive nut relative to the operator base assuming that friction between the shroud and the operator elements is lower than the friction between the shroud and the drive nut. For example, in moving the shroud linearly from the retracted position toward the latched position initially the shroud will rotate with the drive nut since the friction between the flexible diaphragm sleeve and the shroud may be lower than the friction between the drive nut and the shroud. As the shroud begins to engage with the clamp segments friction on the shroud will exceed the friction between the drive nut and the shroud and rotation of the shroud relative to the operator base will cease. Further movement of the shroud will be linear and nonrotatable as the drive nut is rotated to bring the flanges of the valve body and the operator in abutting relation.

As the shroud member moves forwardly toward the valve body, the segment clamps 228 are pivoted by the generally frusto-conical locking cam surface 246 about the pivot point P from the unlocked position as shown in FIG. 7 toward the positions shown in FIGS. 8 and 9. This pivotal clamp movement causes the inwardly diverging slot of each of the segment clamps to engage the inwardly diverging surfaces 230 and 232 of the body flange 72 and the bonnet flange 78 respectively. As the locking cam 246 is moved inwardly toward the valve body, peripheral force is exerted on the segment clamps 228 thereby causing the mating inwardly diverging surfaces of the slots 234 of the clamps and the body and bonnet flanges to cam the body and bonnet flanges into intimate abutting engagement and deforming the annular sealing member 102 resulting in the development of a positive seal at the joint between the body and operator base. The force tending to cam the body flange 72 and the bonnet flange 78 into abutment is controlled by the position of the locking cam surface 246 relative to the clamps 228 and therefore the force applied to the flanges may be adjusted as desired merely by rotation of the drive nut 166. The clamping forces of the segment clamps have a direct relationship with the torque required to rotate the drive nut 166 and therefore in assembly of the operator to the valve body, the drive nut 166 is simply rotated sufficiently to raise the drive torque to a predetermined level to achieve development of a predetermined force betwen the segment clamps and the body and bonnet flanges.

Assuming that the valve and valve operator are in assembly and it is desired to remove the operator, the valve member is moved to its closed position by the hydraulic operator to position the valve member-stem connection and the shank 256 within the guide sleeve. A diver or any suitable remotely controlled equipment may be lowered to the valve level and will simply impart rotation to the drive nut 166 of the operator in a direction to retract the shroud. Because of the connection between the drive nut and shroud and through the threaded connection between the drive nut and the connecting stem 164, the shroud member will be retracted outwardly away from the valve body causing the unlocking cam surface 242 to engage the outwardly extending portion 240 of the segment clamps 228 pivoting the segment clamps about the pivot point P toward the unlatched position thereof as illustrated in FIG. 3. When the shroud 162 has been moved outwardly sufficiently to cause the segment clamp to reach the FIG. 3 position thereof, the operator may be simply retracted outwardly from the valve body. Separation of the valve member and stem will not occur because the connection structure will be disposed within the guide sleeve 88 and the geometry of the connection structure will not have sufficient lateral movement to cause stem separation. The valve member therefore is extracted along with the stem member during separation of the operator from the valve body. The annular deformable sealing member 102 is also extracted along with the valve operator by virtue of the annular abutment 110 which serves as a retainer for the annular seal 102. Only the valve seats and the gate guide elements remain with the valve body upon disassembly of the operator from the body.

While the instant invention has been described with relation to a gate valve structure and with particularity toward a modification adapted for subsea use, it is to be understood that the invention has application with many other types of valves in addition to being applicable to mechanical devices other than valves. This invention therefore is not intended to be limited to the particular mechanism or class of devices shown.

It is evident from the foregoing that I have provided a unique valve and valve operator combination which utilizes a simple mechanical connection structure controllable through a single mechanical element to assemble and disassemble the operator from the valve body. The unique construction of the valve and valve operator according to my invention assures positive alignment between the valve body and valve operator even when the same are assembled and disassembled by remotely controlled mechanical means by virtue of simple location and guide structure of the valve and valve operator. My valve and operator combination is also unique in that it is necessary only to impart rotation only to a single simple mechanical structure to impart linear movement and locking movement of interrelated structure between the valve body and valve operator for quick and simple assembly and disassembly of the same.

The valve and valve operator combination of my invention is effiectively protected from the environment which the valve and operator are submerged by a protective fluid substance which completely fills the protective housing of the operator. The unique construction of my invention also allows the interchange of fluid between various chambers within the valve operator housing without allowing the development of excessive pressure in any portion of the operator housing. My invention also provides a unique connection structure between the valve and valve operator which not only induces development of sufficient forces to maintain the valve and operator in assembly, but also assures the development of a positive seal between the valve and operator which effieciently resists extremely high internal pressures which may be applied thereto by fluid under pressure of the wellhead. Difficult valve and valve operator repair operation which heretofore has been impossible or at least has been extremely expensive are quite readily accomplished in a simple and low cost manner through utilization of valve and valve operator constructions manufactured in accordance with the scope and spirit of my invention. It is clearly obvious that down time on submerged wellheads can be maintained at a minimum since the valve operator and the internal moving parts of the valve can be quite easily replaced in only a few minutes time. It is, therefore, evident that my invention is one well adapted to attain all of the objects hereinabove set forth together with other advantages which will become obvious and inherent from a description of the apparatus itself. It will be understand that certain combinations and subcombinations are of utility and may be employed without reference to other features and subcombinations. This is contemplated by and is within the scope of the appended claims. As many possible embodiments may be made of the invention without departing from the spirit or scope thereof, it is to be understood that all matters hereinabove set forth or as shown in the accompanying drawings are to be interpreted as illustrative and not in a limiting sense.

I claim:

1. A coupling structure comprising a pair of housings each having an annular flange formed thereon, said flanges being disposed in abutment and defining inwardly diverging outer cam surfaces, a single threaded stem carried by one of said housings, a shroud member surrounding said one housing, a drive nut received by said threaded stem, means rotatably securing said shroud to said drive nut so that relative axial movement between said shroud and drive nut is prevented, whereby rotational movement of said drive nut relative to said threaded stem and said shroud will impart linear movement to said shroud relative to said one housing, said shroud means being linearly movable by said drive means between a locking position and a retracted position relative to said one housing, said one housing and said shroud being spaced at one extremity thereof and defining an annular recess, a plurality of segment clamps being loosely retained within said recess, said segment clamps each having slots formed therein which define inwardly diverging walls conforming to the configuration of said cam surfaces on said abutting flanges, said segment clamps being movable within said annular recess by said shroud between a locking position where said slots interfit with said flanges to bias the flanges toward one another and an unlocked position where said segment clamps are positioned clear of said flanges, thereby allowing said flanges to be separated.

2. A coupling structure as set forth in claim 1, said clamps having an out-turned portion at one extremity thereof, an unlocking cam surface defined internally of said shroud and engaging said out-turned portions of said clamps upon movement of said shroud toward the retracted position thereof to cause movement of said clamps to said unlocking position, a tapered surface formed on the exterior of each of said clamps, an internal locking cam surface formed on said shroud and engaging said tapered surfaces during movement of said shroud from the retracted position to the locking position thereof thereby moving said clamps to the clamping position thereof.

3. A coupling as set forth in claim 1, one of said inwardly diverging walls of said slots in said clamps defining pivot points for pivoting said clamps against the inwardly diverging surface of the flange of said one housing, the other of said inwardly diverging walls of said slots extending radially beyond the radial limits of said one wall to a point that is substantially equal to the radial limits defined by said pivot points.

References Cited

UNITED STATES PATENTS

| | | | |
|---|---|---|---|
| 3,096,999 | 7/1963 | Ahlstone et al. | 285—315 X |
| 3,147,992 | 9/1964 | Hacher et al. | 285—308 X |
| 3,239,248 | 3/1966 | Jones | 285—18 X |

DAVE W. AROLA, Primary Examiner

U.S. Cl. X.R.

285—364